(12) United States Patent
Hoagland

(10) Patent No.: US 6,539,895 B2
(45) Date of Patent: Apr. 1, 2003

(54) PORTABLE PET CARRIER

(76) Inventor: Barbara A. Hoagland, 441 N. Park Blvd., Glen Ellyn, IL (US) 60137

( * ) Notice: Subject to any disclaimer, the term of this patent is extended or adjusted under 35 U.S.C. 154(b) by 0 days.

(21) Appl. No.: 09/841,865

(22) Filed: Apr. 25, 2001

(65) Prior Publication Data

US 2001/0029901 A1 Oct. 18, 2001

Related U.S. Application Data

(60) Provisional application No. 60/199,715, filed on Apr. 26, 2000.

(51) Int. Cl.[7] .............................................. A01K 31/07
(52) U.S. Cl. ....................................................... 119/453
(58) Field of Search ................................ 119/452, 453, 119/474, 482

(56) References Cited

U.S. PATENT DOCUMENTS

| 3,710,761 A | * | 1/1973 | Gregory ....................... 119/19 |
| 4,484,540 A | * | 11/1984 | Yamamoto ................... 119/19 |
| 4,852,520 A | | 8/1989 | Goetz |
| 5,253,612 A | | 10/1993 | Goetz |
| D451,646 S | * | 12/2001 | Lerner ........................ D30/109 |
| 6,182,611 B1 | * | 2/2002 | Marchioro .................... 119/453 |
| 6,345,591 B1 | * | 2/2002 | Richmond ................... 119/497 |

FOREIGN PATENT DOCUMENTS

| GB | 2331000 | * | 5/1999 | ............ A01K/1/02 |

* cited by examiner

Primary Examiner—Peter M. Poon
Assistant Examiner—Kevin Jakel
(74) Attorney, Agent, or Firm—Bell, Boyd & Lloyd, LLC

(57) ABSTRACT

A portable pet carrier having a top portion, a middle section and a bottom portion made primarily from a molded synthetic material, with the top portion having a handle-like structure for carrying the assembled pet carrier and the middle portion having holes for ventilation and a door or window-like structure for placing a pet in or removing a pet from the carrier. The middle and bottom portions and the top and middle portions having mating connectors wherein the middle and bottom portions and the top and middle portions can be securely fastened to each other when assembled and can be easily separate from each other when disassembled by way of their respective mating connectors.

2 Claims, 4 Drawing Sheets

US 6,539,895 B2

PORTABLE PET CARRIER

This application claims the benefit of the earlier filing date of Provisional Application Ser. No. 60/199,715, filed Apr. 26, 2000.

BACKGROUND OF THE INVENTION

This invention is addressed to a portable pet carrier for transporting pets. More particularly, the portable pet carrier of the present invention is designed with a variety of features to provide for improved access to the interior of the carrier resulting in improved openings for placing and/or removing a pet.

A variety of prior art carriers have been proposed for such a purpose, including carriers described in U.S. Pat. Nos. 4,852,520 and 5,253,612. Such carriers typically have an upper and lower section, made partly or wholly from synthetic material, and a variety of clips or connectors which hold the two sections together. While the patents identified above describe an improvement in the assembly of the sections, using compression snap-lock pins, improved designs for such carriers in actual use, that is, when placing or removing pets, is necessary.

SUMMARY OF THE INVENTION

The concepts of the present invention reside in a novel design for a pet carrier having upper and lower sections which can be easily assembled and disassembled when a pet is placed in or removed from the carrier. The pet carrier of the present invention may have a three-piece construction, namely a construction having a top, middle and bottom section. The sections of this construction are typically molded from a synthetic material. The top and middle sections may be fixedly connected on one side by way of one or more hinges to allow the top section to open and still remain attached to the middle section. The other side of the top and middle portions are provided with mating connectors to allow the top and middle portions to be securely fastened to each other. The middle and bottom portions are provided with mating connectors to also be securely fastened to each other and to allow the carrier to be assembled and disassembled.

Alternatively, instead of a fixed connector, such as a hinge, the top and middle portions can be provided with mating connectors to allow those sections to be separate but easily assembled and disassembled. The top portion has a handle or handle-like design to allow for carrying the pet carrier. In addition, a door or window-type of opening may be provided in the middle portion as an additional entry or exit path for the pet.

Optionally, the pet carrier of the present invention may of two piece construction, having an upper and lower section. Those sections are also molded from a synthetic plastic material and are provided with mating connectors such as snaps or latches to be securely fastened to each other and to allow the carrier to be assembled and disassembled. The upper section is usually provided with a handle for carrying and a door or window-type of opening as an additional entry or exit path for the pet. The synthetic material used allows for improved ease in transporting a pet, while the mating connectors provide a carrier which can be easily assembled and disassembled.

It is, therefore, an object of the present invention to to overcome the problems encountered by prior art carriers by providing a novel portable pet carrier which can be easily assembled and disassembled when a pet is placed in or removed from the carrier. A further object is to provide improved and reliable designs of three-piece construction for securely holding together the portions of the-carrier itself. Another object is to provide alternative designs with two sections which can also be easily assembled and disassembled when a pet is placed in or removed from the carrier.

DETAILED DESCRIPTION OF THE INVENTION

Figure 1:
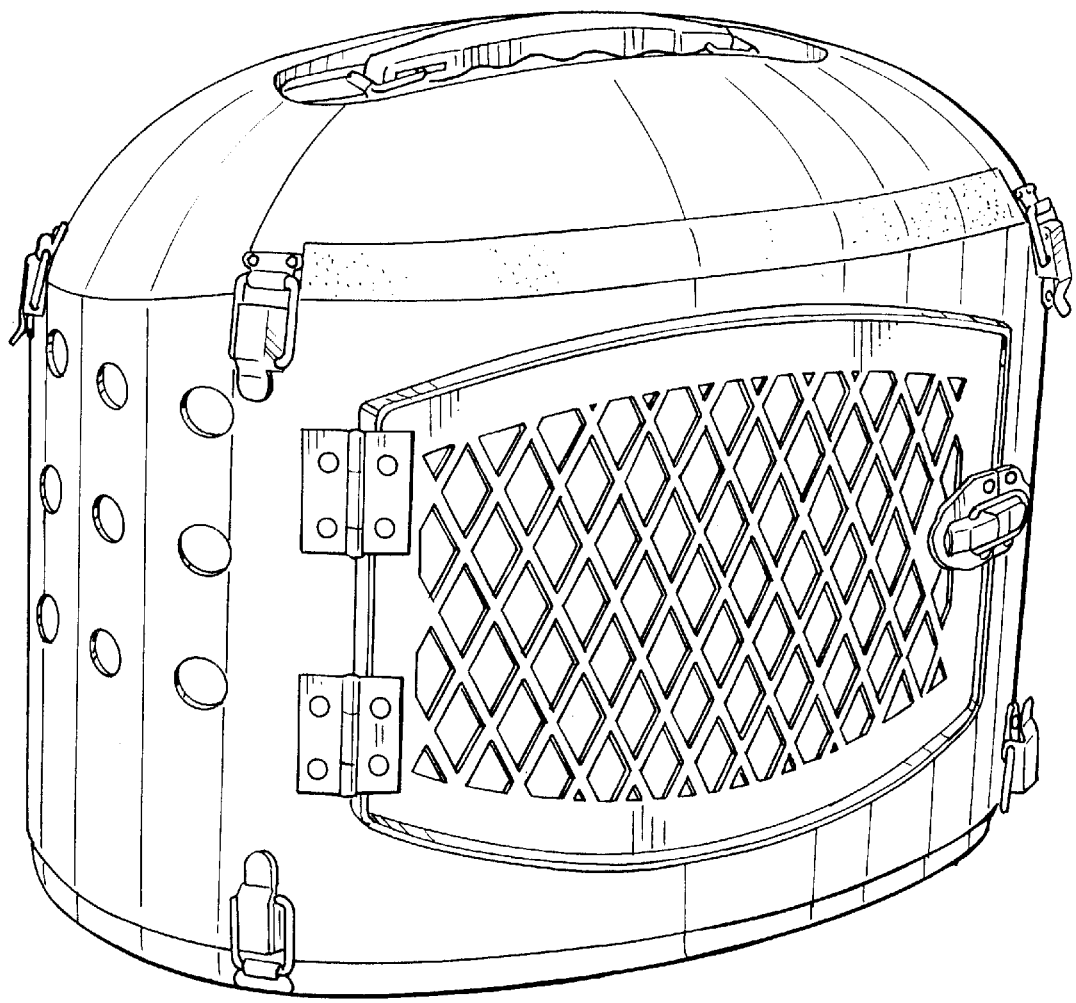
FIG. 1 is a front elevation of one embodiment of the portable pet carrier fully assembled.
Figure 2:
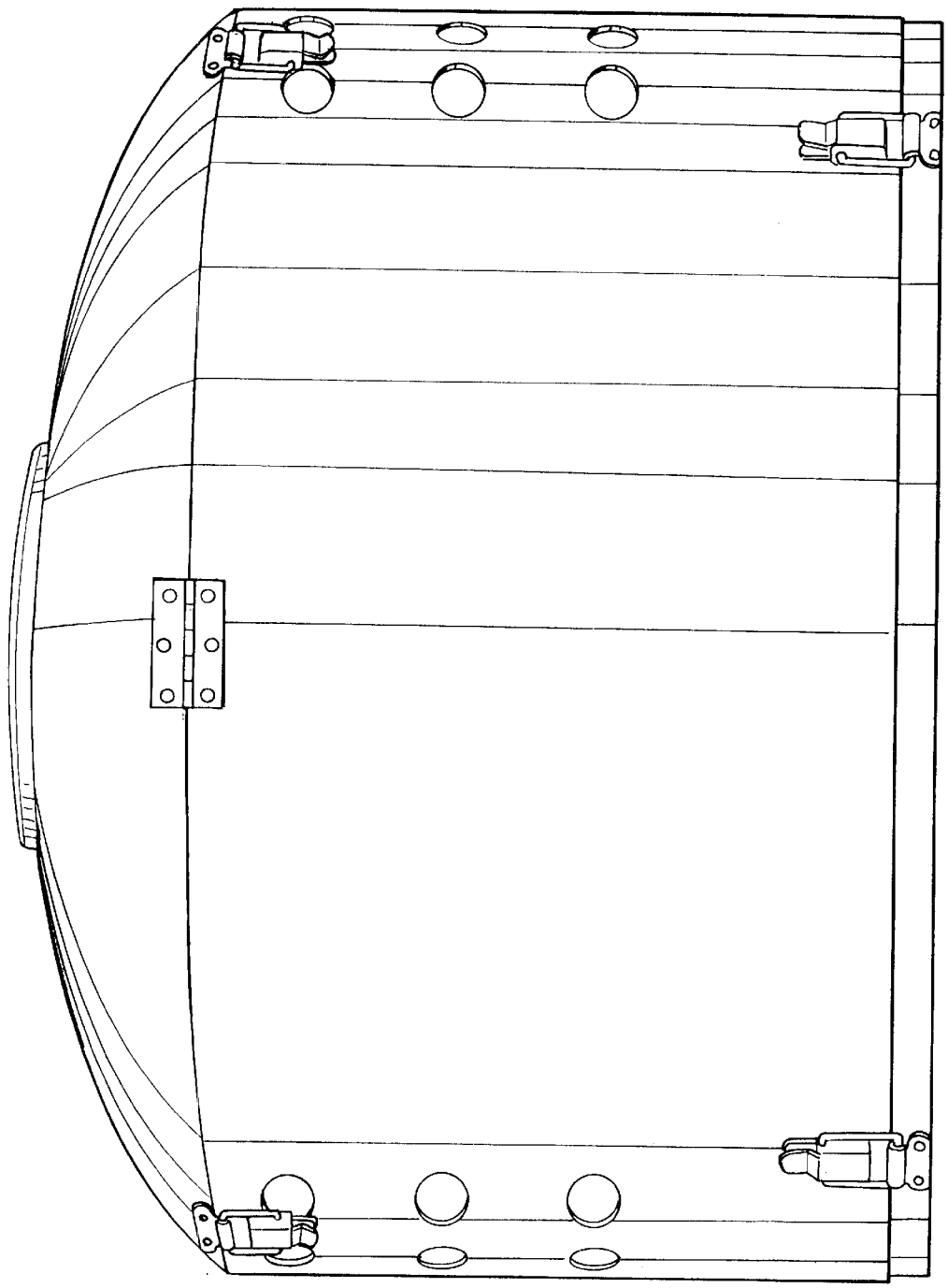
FIG. 2 is a rear elevation of one embodiment of the portable pet carrier fully assembled.
Figure 3:
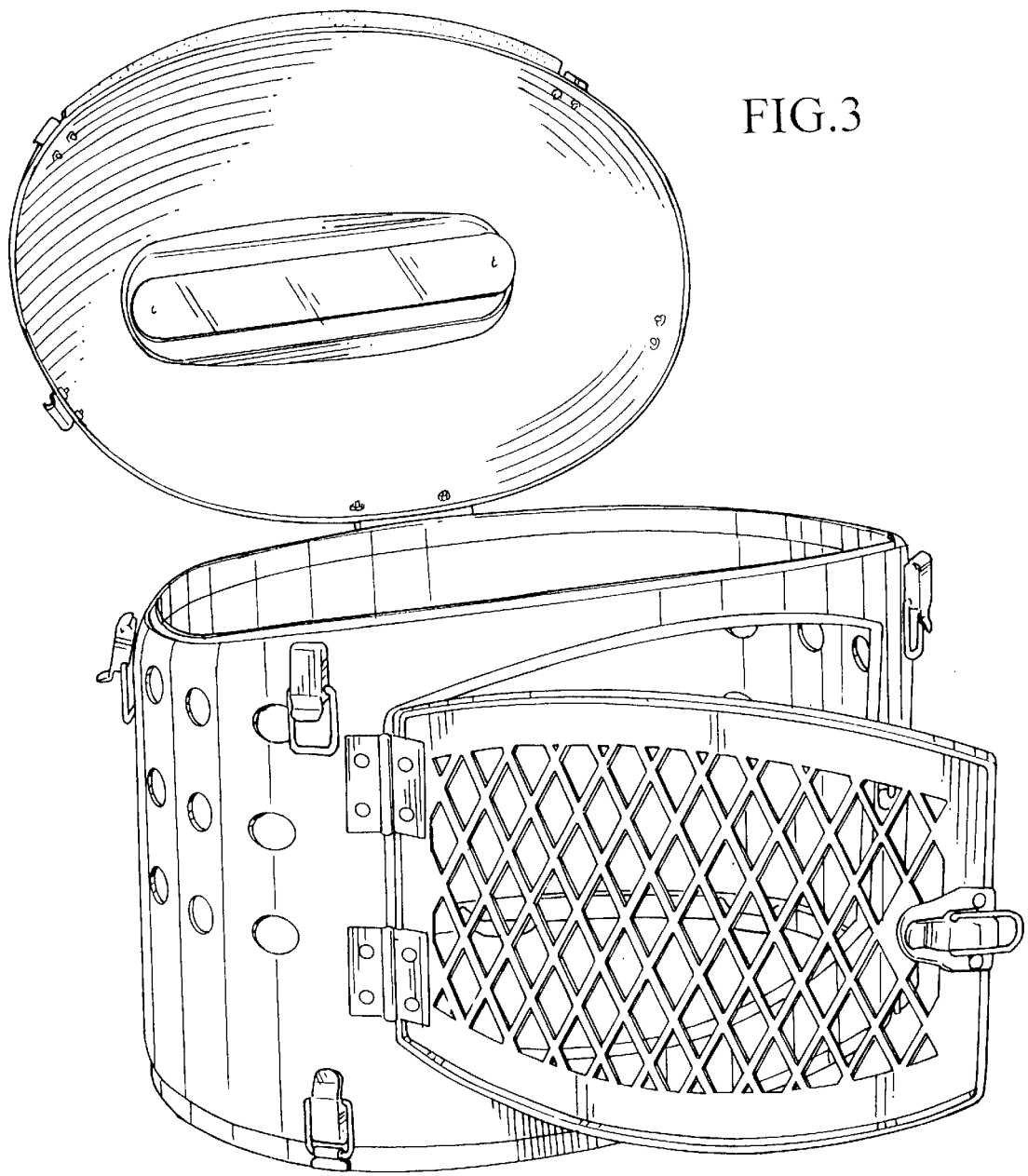
FIG. 3 is a front elevation of one embodiment of the portable pet carrier with the door or window and top portion open.
Figure 4:
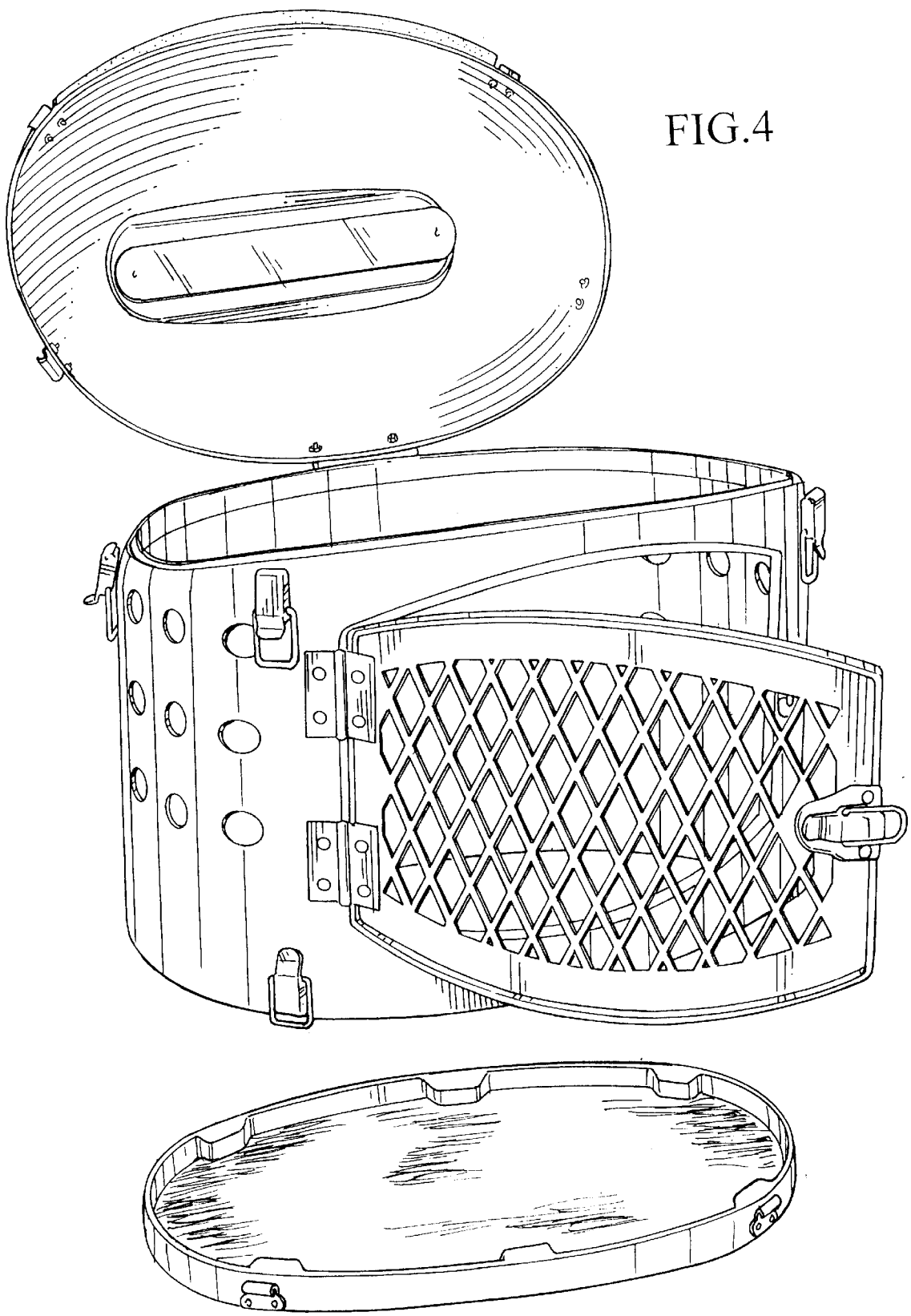
FIG. 4 is a front elevation of one embodiment of the portable pet carrier disassembled.

Referring to FIGS. 1–4, one embodiment of the pet carrier of the present invention can be readily understood. FIGS. 1 and 2 illustrate the three-piece construction of the pet carrier fully assembled. FIGS. 3 and 4 show the three-piece construction partially disassembled.

As shown in FIGS. 1 and 2, the pet carrier has a top, middle and bottom portion made primarily from a molded synthetic material. A handle or handle-like structure is provide in the top portion of the carrier to allow for carrying. Usually, a door or window-type opening is provided in the middle portion for placing the pet in or removing it from the pet carrier. In addition, air holes are usually provided in the sides of the middle portion to allow for ventilation for the pet.

As further illustrated in FIG. 3, the middle and bottom portions are provided with mating connectors, such as snaps or latches to securely fasten the portions together when the pet carrier is assembled. Such mating connectors also allow for easy assembly or disassembly of the pet carrier when placing the pet in or removing the pet from the carrier. No additional tools are needed for assembly or disassembly.

As shown in FIG. 4, the top and middle portions of the three-piece construction of the pet carrier may be fixedly connected to each other on one side by way of hinge or hinge-like connectors. In addition, to allow for another path for placing the pet in, or removing the pet from, the pet carrier, the top and middle portions are provided with mating connectors, such as snaps or latches to securely fasten the portions together when the pet carrier is assembled and to easily disassemble the pet carrier when necessary. Alternatively, instead of a hinge-like connector, the top and middle portions may be provided with mating connectors to allow for total assembly and disassembly of the top and middle portions. Once again, no additional tools are required for assembly or disassembly.

In an alternative embodiment (not shown), the top and middle sections may be molded as one-piece, allowing for a pet carrier with a two-piece construction. The upper section is provided with a handle or handle-like structure for carrying. The upper section is also provided with a door or window-like structure to allow for removal or placement of the pat in the carrier. Air holes are also provided in the upper section for ventilation.

As in the three-piece construction, the upper and lower sections are provided with mating connectors, such as snaps or latches to securely fasten the portions together when the pet carrier is assembled. Such mating connectors also allow for easy assembly or disassembly of the pet carrier when placing the pet in or removing the pet from the carrier. No additional tools are needed for assembly or disassembly.

As can be seen from the foregoing, the pet carrier of the present invention allows for improvements in the assembly or disassembly of pet carrier as well as transportation of pets. In addition, the pet carrier of the present invention allows for a variety of paths for placing a pet in or removing it from the carrier. It will be understood that various changes and modifications may be made in the details set forth above without departing from the spirit of the invention especially as defined in the following claims.

What is claimed:

1. A portable pet carrier having a top portion, a middle section and a bottom portion made primarily from a molded synthetic material; said top portion having a handle-like structure for carrying the assembled pet carrier and said middle portion having holes for ventilation and a door or window-like structure for placing a pet in or removing a pet from the carrier; said middle and bottom portions having mating connectors and said top and middle portions having mating connectors; wherein said top and middle portions are fixedly attached on one side with a hinge-like connector and removably attached on another side with mating connectors and said middle and bottom portions can be securely fastened to each other when assembled and can be easily separated from each other when disassembled by way of their respective mating connectors.

2. The portable pet carrier of claim 1 wherein said mating connectors are fixedly attached to their respective upper, middle and lower portions.

* * * * *